(12) United States Patent
Volokh (10) Patent No.: US 9,333,565 B2
(45) Date of Patent: May 10, 2016

(54) ROTARY CUTTER (75) Inventor: Vladimir Volokh, Maalot (IS)

(73) Assignee: SOMTA TOOLS (PTY) LTD., Pietermaritzburg (ZA)

( * ) Notice: Subject to any disclaimer, the term of this patent is extended or adjusted under 35 U.S.C. 154(b) by 128 days.

(21) Appl. No.: 13/984,834

(22) PCT Filed: Feb. 15, 2012

(86) PCT No.: PCT/IL2012/000079
§ 371 (c)(1),
(2), (4) Date: Aug. 9, 2013

(87) PCT Pub. No.: WO2012/111004
PCT Pub. Date: Aug. 23, 2012

(65) Prior Publication Data
US 2013/0315681 A1    Nov. 28, 2013

(30) Foreign Application Priority Data
Feb. 15, 2011 (IL) .......................................... 211236

(51) Int. Cl.
*B23C 5/10* (2006.01)
*B23C 5/12* (2006.01)
(Continued)

(52) U.S. Cl.
CPC . *B23C 5/12* (2013.01); *B23B 51/02* (2013.01); *B23C 5/10* (2013.01); *B23C 5/1009* (2013.01); *B23D 77/00* (2013.01); *B23B 2251/248* (2013.01); *B23B 2251/402* (2013.01); *B23B 2251/404* (2013.01); *B23B 2251/446* (2013.01); *B23C 2210/241* (2013.01);
(Continued)

(58) Field of Classification Search
CPC .............. B23B 51/08; B23B 2251/046; B23C 2210/0492; B23C 2210/282; B23C 2210/321; B23C 2210/325; B23C 2210/402; B23C 2210/405; B23C 2210/407; B23C 2210/445; Y10T 407/1946; Y10T 407/1948; Y10T 407/195; Y10T 407/1958; Y10T 407/196; Y10T 407/1962; Y10T 407/1966; Y10T 408/868; Y10T 408/899; Y10T 408/905; Y10T 408/909; Y10T 408/9095; Y10T 408/9097
USPC ............ 407/53–55, 59–61, 63; 408/188, 211, 408/227, 229, 223, 230
See application file for complete search history.

(56) References Cited

U.S. PATENT DOCUMENTS 2,258,674 A * 10/1941 Ceska .................... B23D 77/00
                                                       408/230
2,411,209 A * 11/1946 Hall et al. ................. F28G 3/14
                                                       15/104.09
(Continued)

FOREIGN PATENT DOCUMENTS

DE          29620308 U1 *  4/1997
DE       102007062539 A1 *  6/2008
WO    WO 2010125881 A1 * 11/2010

*Primary Examiner* — Daniel Howell
*Assistant Examiner* — Nicole N Ramos
(74) *Attorney, Agent, or Firm* — Law Offices of Steven W. Weinrieb (57) ABSTRACT

The present invention relates to a rotary cutting tool consisting of a shank and at least one cutting section comprising a plurality of cutting teeth, the cutting section being conceptionaly and functionally divided into several sub-sections along the tool axis ("zones" for brevity), wherein each zone has its own core form and its own cutting edges, its own teeth land form and its own zone cutting length, these being selected according to the perceived task for which each zone of the tool is to be optimized.

12 Claims, 5 Drawing Sheets

(51) Int. Cl.
*B23B 51/02* (2006.01)
*B23D 77/00* (2006.01)

(52) U.S. Cl.
CPC .... *B23C 2210/405* (2013.01); *B23C 2210/445* (2013.01); *B23D 2277/44* (2013.01); *B23D 2277/62* (2013.01); *Y10T 407/1946* (2015.01); *Y10T 407/1948* (2015.01); *Y10T 407/1954* (2015.01); *Y10T 408/9095* (2015.01)

(56) References Cited

U.S. PATENT DOCUMENTS

| | | | | |
|---|---|---|---|---|
| 4,507,028 | A | * | 3/1985 | Matsushita .................. 408/230 |
| 4,936,721 | A | * | 6/1990 | Meyer .................... B23B 51/08 408/224 |
| 5,678,960 | A | * | 10/1997 | Just et al. .................... 408/230 |
| 5,888,036 | A | * | 3/1999 | Arai et al. .................... 408/230 |
| 6,190,097 | B1 | * | 2/2001 | Thomas ....................... 408/230 |
| 6,742,968 | B1 | * | 6/2004 | Volokh ........................ 407/34 |
| 6,964,546 | B1 | * | 11/2005 | Vakil ..................... B23B 49/008 408/1 R |
| 7,204,663 | B2 | * | 4/2007 | Dov et al. ............... B23B 51/08 407/53 |
| 7,322,774 | B2 | | 1/2008 | Volokh |
| 2003/0185640 | A1 | * | 10/2003 | Ito ................................ 408/230 |
| 2004/0067115 | A1 | * | 4/2004 | Yamamoto .................. 408/230 |
| 2004/0120777 | A1 | * | 6/2004 | Noland ........................ 407/63 |
| 2006/0110225 | A1 | | 5/2006 | Dov et al. |
| 2008/0069653 | A1 | * | 3/2008 | Glimpel et al. .............. 408/193 |
| 2009/0047080 | A1 | * | 2/2009 | Schweighofer et al. ....... 408/59 |
| 2010/0054881 | A1 | * | 3/2010 | Thomas et al. ............. 408/1 BD |
| 2010/0086373 | A1 | * | 4/2010 | Kleiner ........................ 408/1 R |
| 2013/0045058 | A1 | * | 2/2013 | Schwagerl ................... 408/230 |

* cited by examiner

ROTARY CUTTER

FIELD AND BACKGROUND OF THE INVENTION

The present invention relates to tools used in the machining of materials by machine tools. More particularly, the invention provides a rotary end mill for the rough and fine machining of metals, a drill particularly suited to the drilling of deep holes, and a reamer also for machine use.

End mills are widely used in milling operations due to their versatile range of application and due to the moderate first cost of the tool. Integral end mills are often of cylindrical shape, and are available up to about 80 mm diameter, Many end mills have flat ends; although other shapes such as conical and rounded ends are also used. An end-mill typically has 2 to 10 teeth, depending on diameter, size and whether intended for rough cutting or finishing. Teeth are usually of spiral shape, but can be straight parallel to the axis. Teeth are also provided at the end face. End mills have a shank portion and a cutting portion, although some end mills have a cutting portion at each side of the shank portion. Material of construction is high speed steel, solid carbide, Wolfram carbide, Cubic boron nitride, Poly-crystal diamond, cermets, ceramic, and combinations thereof. Coatings are often applied to the cutter to extend the working life thereof.

The design of an end mill is a function of the balance between contradictory requirements—rigidity to prevent tool chatter and strength to avoid breakage, versus generous spacing between the teeth to allow the clearance of chips and access for a liquid coolant. With regard to drills similar considerations apply, when the depth of the hole being drilled is several times as large as the diameter of the drill.

In conventional end mills the shape and thickness of the tooth, determined with reference to the expected use of the cutter, remains constant along the length of the cutting tool. An improvement on the constant cross-sectional shape and size of a milling cutter was disclosed in a previous patent, U.S. Pat. No. 6,742,968 dated Jun. 1, 2004. The cutter tool disclosed was an end mill wherein the total cross-sectional area of the cutter material and particularly the core portion, taken at right angles to the cutter axis, increases gradually from the cutting end towards the cutter shank. This design provided a cutter which combined adequate chip clearance with improved rigidity.

With regard to drills intended for the drilling of deep holes, the difficulty of chip clearance and application of a coolant to the cutting tip of the drill is more severe than with end mills, and often there is little choice but to withdraw the drill at least once during the drilling of a single hole. Failure to do so may result in the spaces between the spirals being jammed with chips and the drill being broken or damaged by overheating due to coolant being unable to reach the drill tip.

Similar conditions apply to machine reamers, although the small quantity of removed metal causes little difficulty.

The machining of features such as slots, flats, outer profile, gear teeth and the like is often executed in three stages—rough machining with maximum possible metal removal rates, machining to near dimensions and finish machining to produce a smooth surface. Often different cutting tools are needed for each stage of machining, the changeover causing lost time and resetting. This could be avoided if a multi-purpose tool were available to carry out the whole machining process.

OBJECT OF THE INVENTION

It is therefore one of the objects of the present invention to obviate the limitations of prior-art end mills and drills and to provide a design which can be used for slotting, roughing and finishing, and for drills and reamers which operate better while working in deep holes.

SUMMARY OF THE INVENTION

The present invention achieves the above objects by providing a rotary cutting tool consisting of a shank and at least one cutting section comprising a plurality of cutting teeth, said cutting section being divided into several sub-sections along the tool axis ("zones" for brevity), wherein each zone has its own core form and its own cutting edges, its own teeth land form and its own zone cutting length, these being selected according to the perceived task for which each zone of said tool is to be optimized.

REFERENCED EMBODIMENT OF THE INVENTION

In a preferred embodiment of the present invention there is provided a cutting tool which is an end mill.

In a further preferred embodiment of the present invention there is provided a rotary cutting tool wherein in a first zone starting from the outer face of the end mill the cutter is optimized for slotting, the second zone is optimized for side milling roughing, the third zone is optimized for finishing side milling, in the fourth zone the grooves forming the cutter teeth blend into said shank.

In another preferred embodiment of the present invention there is provided a rotary cutting tool wherein
the length of said first zone designed for slotting is in the range of 0.3 D to 2.0 D, D being the outer diameter of said cutting section, said length being at a maximum for stub end mills and being at a minimum for extra long end mills;
said cutting section of said second zone designed for rouging side milling, combined with said first zone, has a length of 0.0 D to 2.0 D, said length being at a minimum for stub end mills and being at a maximum for regular length end mills;
the length of said third zone designed for finish side milling combined with said first zone or with said second zone is in the range of 0.0 D to 8.0 D, said length being at a minimum for stub end mills and being at a maximum for extra long end mills;
said fourth zone being a transfer zone from said cutting zones to said shank has a length in the range of 0.3 D to 1.5 D, said length being set according to the length of the cutting section and the number of teeth of the cutter.

In a further preferred embodiment of the present invention there is provided a rotary cutting tool wherein each zone includes at least one sub-zone with geometrical elementary core forms of each sub-zone core form.

In a further preferred embodiment of the present invention there is provided a rotary cutting tool being a drill.

In yet a further preferred embodiment of the present invention there is provided a rotary cutting tool being a reamer.

Yet further embodiments of the invention will be described hereinafter.

It has now been found that advantages can be obtained by design of the cutting section having a profile and core diameter specifically configured to a pre-defined method of use. While this configuration may appear to cause difficulties in producing such a cutting tool the use of modern computer-controlled machine tools enables production of such metal cutting tools at a cost only a little higher than the cost of manufacturing conventional tools. It will thus be realized that the novel machining tool of the present invention optimizes each operation separately and thus serves to reduce machining time and saves further time by eliminating frequent tool change.

Tests have been carried out on a prototype cutter to determine the performance of an end mill manufactured according to the present invention. The following is an extract from machining tests carried out recently (2010) in the lab.

Cutter: 12 mm diameter end mill.
Number of teeth: 4
Material being machined: Stainless Steel 316
Slotting: Slot depth 3.6 mm Feed per tooth: 0.09 mm
  Slot depth 6 mm Feed per tooth: 0.055 mm
  Slot depth 12 mm Feed per tooth: 0.05 mm
  Slot depth 18 mm Feed per tooth: 0.045 mm It should be noted that textbook recommendations for a standard end mill where slot depth is 3.6 mm are about half these values, with some variation depending on the material of construction of the cutter, the rigidity of the milling machine, whether the cutter is coated and whether the material being cut has been fully annealed. In all cases an adequate supply of coolant is provided.

With regard to previous patent, U.S. Pat. No. 6,742,968 the cross-sectional area of the core increased at a steady rate which could be considered as fitting into a single zone, as will be seen in FIGS. 1 and 1a.

In contradistinction to the '968 patent the present application features cutting tools which have at least two, and usually four. The form of the tool zones is decided individually at the time of the manufacturing order to optimize each zone for a defined purpose. Specific features which may change from one zone to the next may include changes in the core diameter, in the width of the land adjacent the cutting edge and changes in tooth thickness.

The aim of these form variations is different for various types of tool. For end mills it is most important to prevent tool chatter resulting from bending of the tool, while for a drill allowing coolant to reach the cutting area and preventing clogging of the tool spirals is the primary goal. With regard to reamers it is important to prevent tooth blunting and in small diameters to prevent tool breakage.

SHORT DESCRIPTION OF THE DRAWINGS

The invention will now be described further with reference to the accompanying drawings, which represent by example preferred embodiments of the invention. Structural details are shown only as far as necessary for a fundamental understanding thereof. The described examples, together with the drawings, will make apparent to those skilled in the art how further forms of the invention may be realized.

In the drawings.

DETAILED DESCRIPTION OF THE INVENTION

Figure 1:
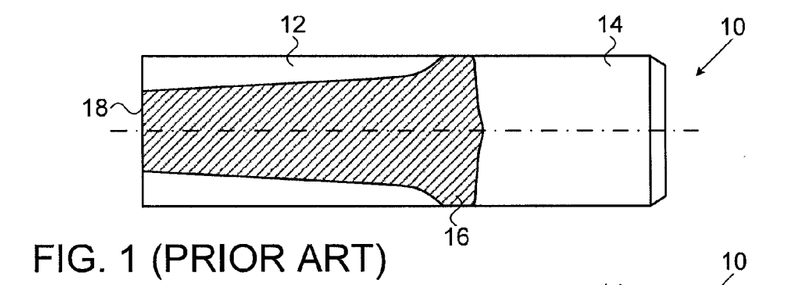
FIG. 1 is a partly sectioned elevational view of a prior art end mill.
Figure 1A:
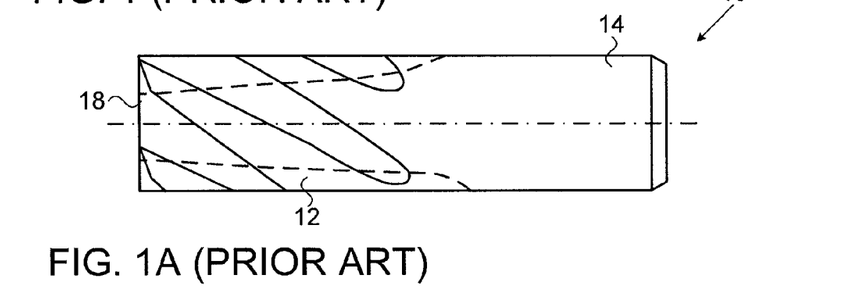
FIG. 1a is an elevational view of the same.

There is seen in FIG. 1 and 1a a prior art end mill 10 with a cutter section 12 and an adjacent shank section 14. The central feature of this design was the tapered core section 16, which provided good chip clearance and room for coolant access near the end face 18 of the cutter section 12 in combination with good strength and rigidity near the shank section 14 where the increased diameter of the core 16 helped to resist the high bending stresses which occur when the end mill is in use.

Figure 2:
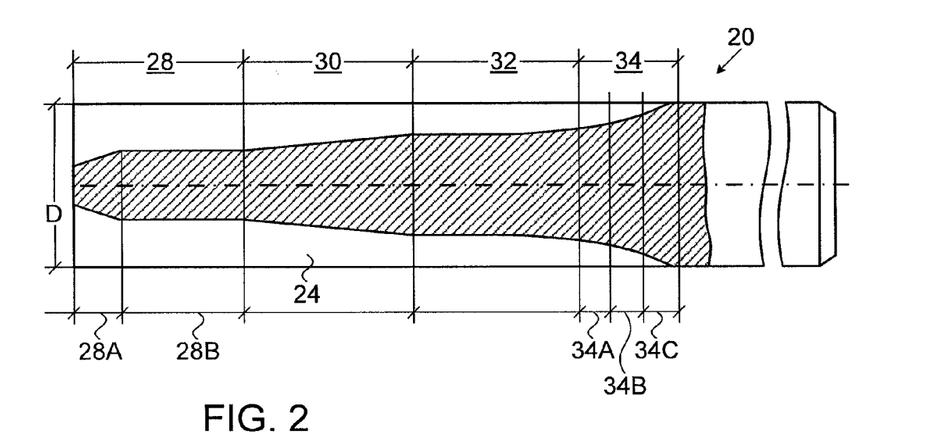
FIG. 2 is a partially sectioned view of a preferred embodiment of the end mill according to the invention.
Figure 3:
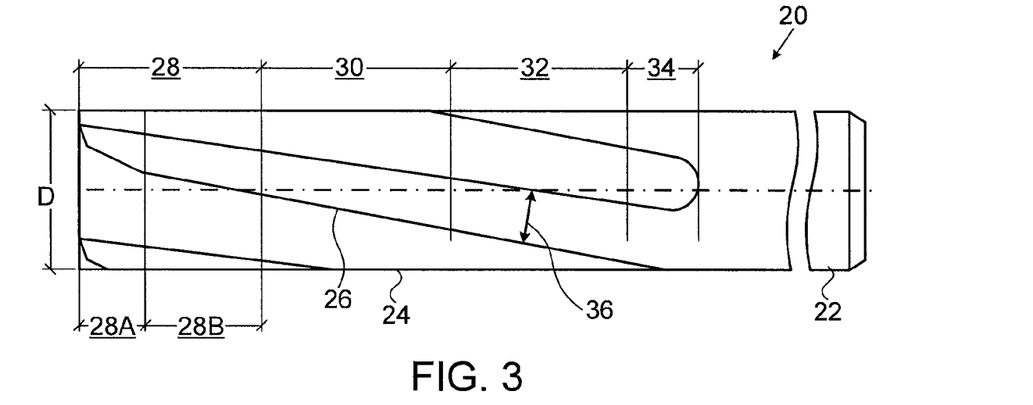
FIG. 3 is an elevational view of a further embodiment of the end mill.

Referring now to FIG. 2, the rotary cutting tool is an end mill 20 consisting of a shank section 14 and a cutting section 24. The cutting section 24 comprises a plurality of cutting teeth 26 which will be seen in FIG. 3.

The cutting section 24 is conceptionaly and functionally divided into 4 sub-sections 28, 30, 32, 34 along the tool axis ("zones" for brevity).

Each zone has its own core form and own zone length. As will be seen in FIG. 3, each zone also has its own cutting edges and its own tooth land form, all these being selected according to the perceived task for which each zone of the tool is to be optimized.

In the present embodiment the end mill 20 has a constant outer diameter D along the length of the cutting section 24.

The zones 28 and 34 are divided into sub-zones 28a, 28b and 34a, 34b and 34c, each with its own geometrical elementary core form.

With reference to the rest of the figures, similar reference numerals have been used to identify similar parts.

FIG. 3 again illustrates the end mill 20 provided with a plurality of cutting teeth 26. It will be seen that each zone has its own tooth land width 36.

Figure 4A:
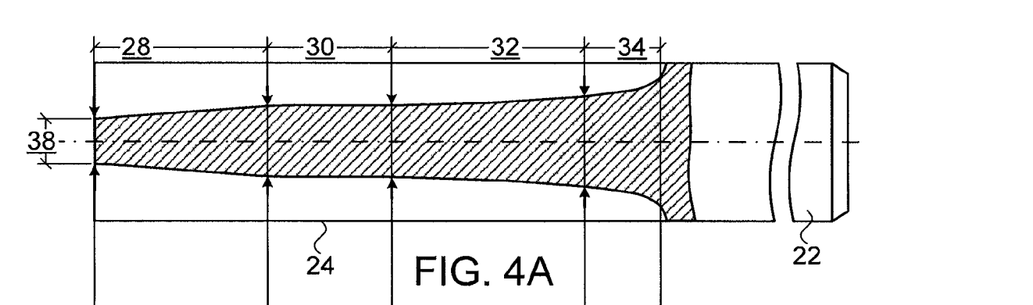
FIG. 4a is a partially sectioned view of a further embodiment of the end mill.
Figure 4B:
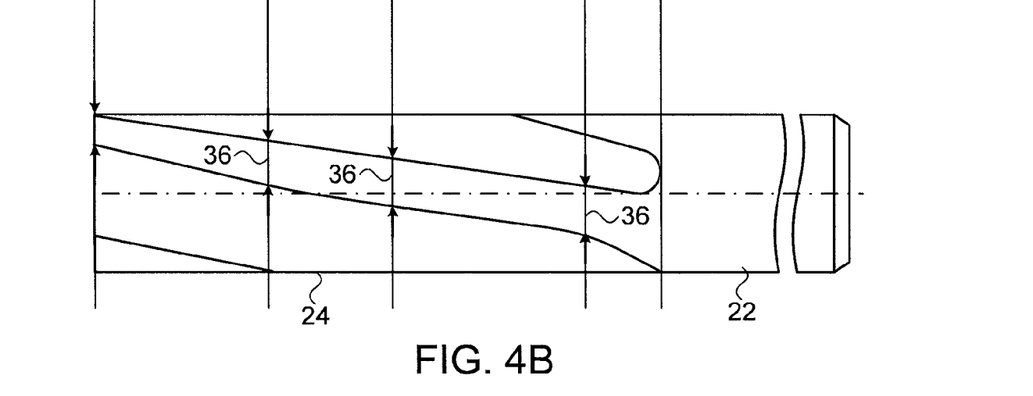
FIG. 4b is an elevational view of the same embodiment of the end mill.

Seen in FIGS. 4a and 4b is an end mill wherein in the first zone 28 the core diameter 38 and the width of the tooth land 36 both increase.

In the second zone 30 the core diameter 38 and the width of the tooth land 36 both remain constant.

In the third zone 32 the core diameter 38 and the width of the tooth land 36 both increase further.

In the fourth zone 34 the core diameter 38 increases in concave form towards the shank 14.

Figure 5A:
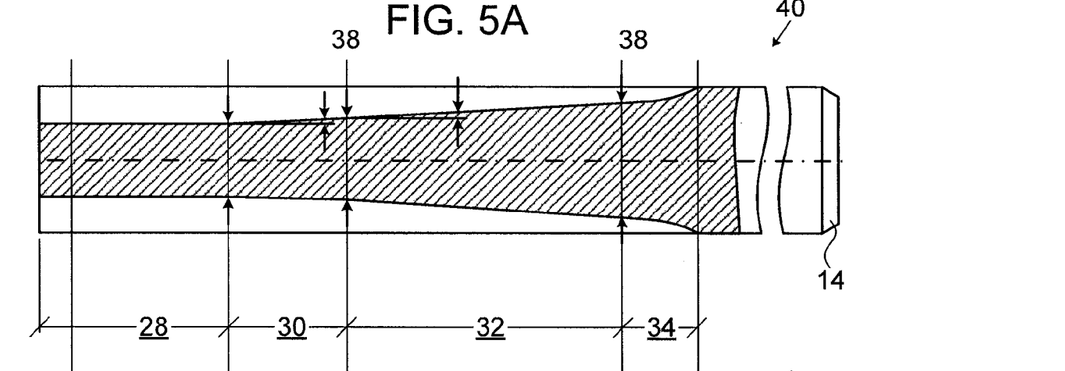
FIG. 5a is a is a partially sectioned view of a further embodiment of the end mill.
Figure 5B:
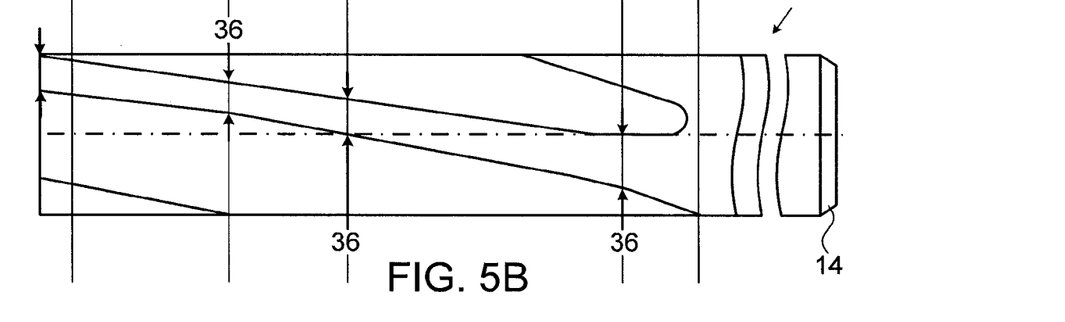
FIG. 5b is an elevational view of the same embodiment of the end mill.

Referring now to FIGS. 5a and 5b, there is depicted an end mill 40 wherein in the first zone 28 the core diameter 38 and the width of the tooth land 36 both remain constant.

However in the second zone 30 the core diameter 38 increases while the width of the tooth land 36 remains constant or increases.

In the third zone 32 the core diameter 38 again increases and the width of the tooth land 36 increases or remain constant.

Finally in the fourth zone 34 the core diameter 38 increases in concave form towards the shank section 14.

Figure 6A:
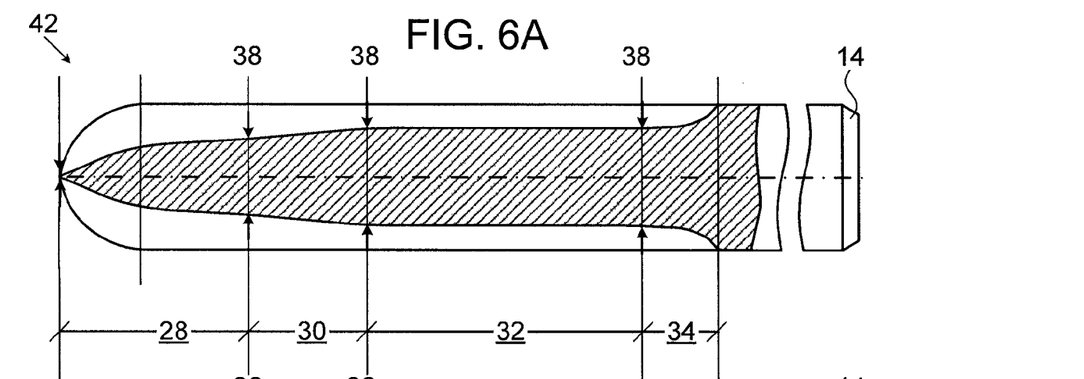
FIG. 6a is a partially sectioned view of a ball-nose end mill.
Figure 6B:
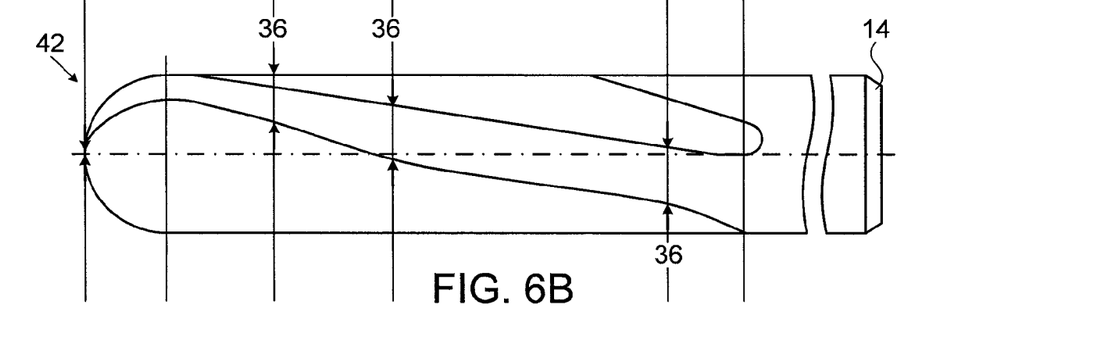
FIG. 6b is a partially sectioned view of the same.

FIGS. 6a and 6b show a ball nose end mill 42 wherein in the first zone 28 the core diameter 38 has a convex taper form and the width of the tooth land 36 increases or remains constant.

Figure 7A:
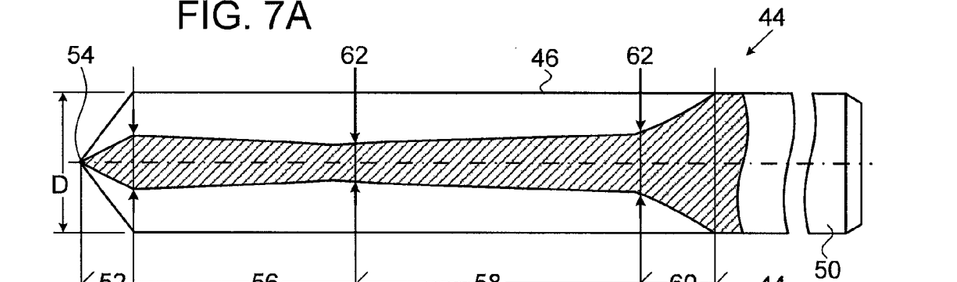
FIG. 7a is a partially sectioned view of a drill according to the invention.
Figure 7B:
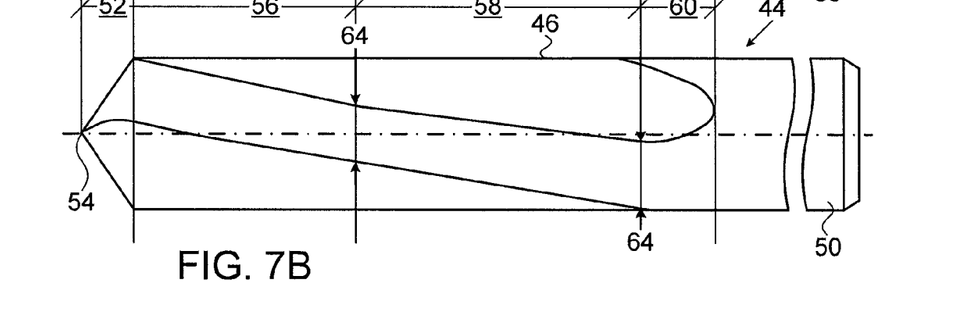
FIG. 7b is an elevational view of the same.

FIGS. 7a and 7b illustrate a rotary cutting tool being a drill 44 having an outer diameter of D, and provided with a cutting section 46 comprising 2 cutting teeth 48 and a shank section 50.

The cutting section 46 is conceptionaly and functionally divided into four zones along the drill axis.

A first zone 52 contains the drill point 54.

A second zone 56 combined with the first zone has a length of 0.2 D to 3.0 D.

A third zone 58 combined with the second zone 56 is in the range 0.0 D to 40 D

A fourth zone 60 is a transfer zone from the cutting section 46 to the shank 50, and has a length in the range 0.3 D to 1 D It is seen that in the second zone 56 the core diameter 62 decreases and the tooth land width 64 also decreases.

In the third zone 58 the core diameter 62 remains constant and the tooth land width 64 is also constant.

Figure 8A:
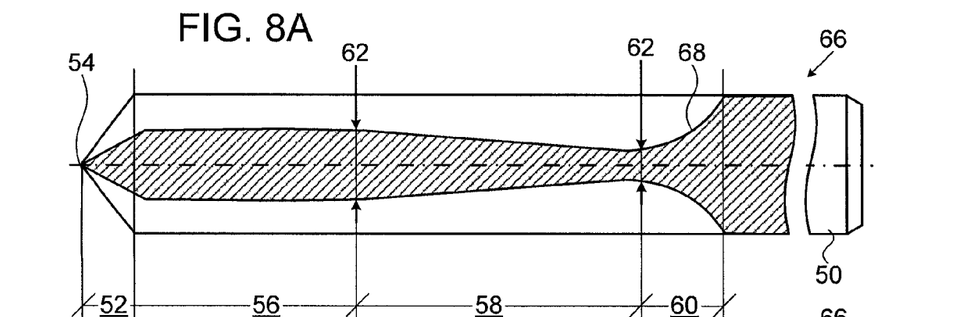
FIG. 8a is a partially sectioned view of a further embodiment of the drill.
Figure 8B:
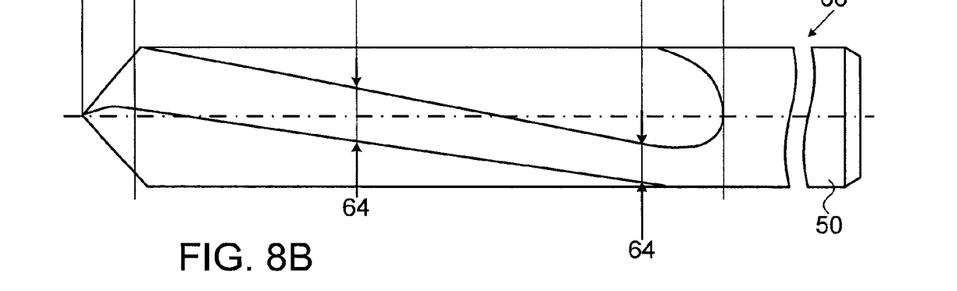
FIG. 8b is an elevational view of the same.

Seen in FIGS. 8a and 8b is second embodiment of a drill 66.

The first zone 52 contains the drill point 54.

In the second zone 56 the core diameter 62 remains constant and the tooth land width 64 decreases.

In the third zone 58 the core diameter 62 decreases and the tooth land width 64 further decreases.

In the fourth zone 60 the core diameter 62 increases to form a concave curve 68 merging into the shank section 50.

Figure 9A:
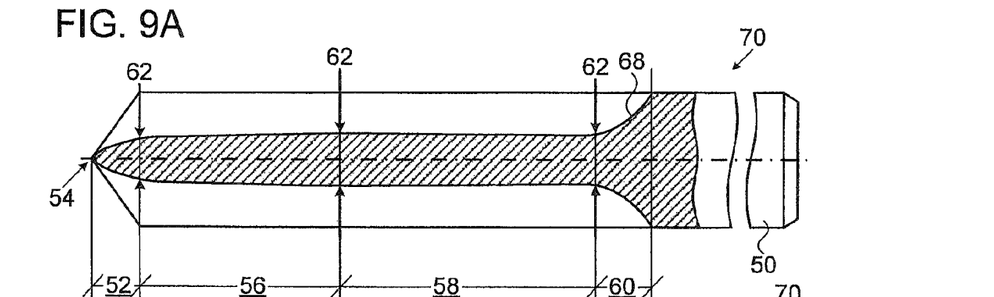
FIG. 9a is a partially sectioned view of a further embodiment of the drill.
Figure 9B:
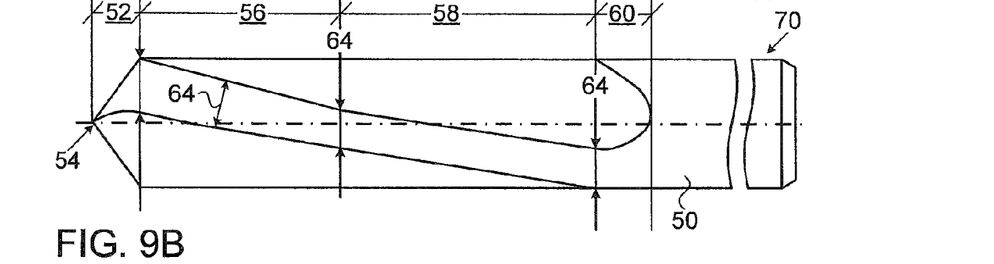
FIG. 9b is an elevational view of the same.

Turning now to FIGS. 9a and 9b, there is depicted a drill 70 wherein

The first zone 52 contains the drill point 54.

In the second zone 56 the core diameter 62 increases while the tooth land width 64 decreases, In the third zone 58 the core diameter 62 remains constant and the tooth land width 64 is constant.

In the fourth zone 60 the core diameter 62 increases to form a concave curve 68 merging into the shank section 50.

Figure 10A:
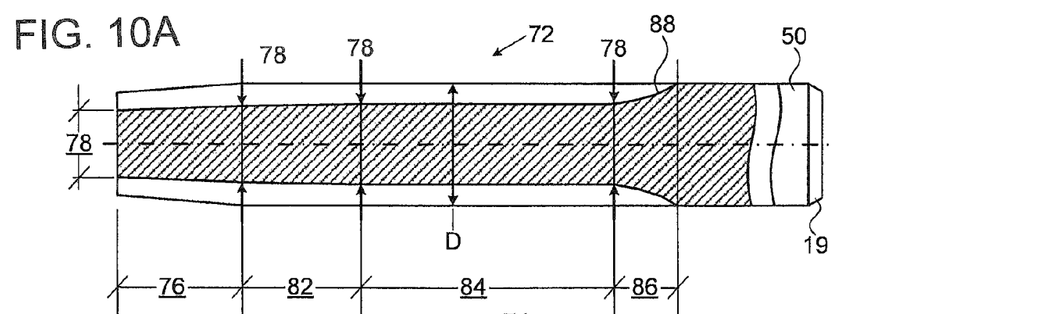
FIG. 10a is a partially sectioned view of a reamer according to the invention.
Figure 10B:
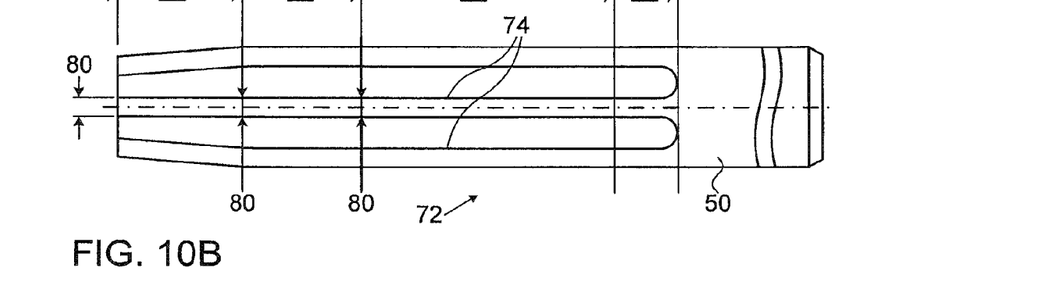
FIG. 10b is an elevational view of the same.

FIG. 10 shows a reamer 72 wherein the cutting teeth 74 are straight parallel to the tool axis 19.

In the first zone 76 the outer diameter D increases as does the core diameter 78 and the land width 80.

In the second zone 82 the outer diameter D remains constant while both the core diameter 78 and the land width 80 increase further.

In the third zone 84 all items remain constant.

In the fourth zone 86 the core diameter 78 increases to form a shallow concave curve 88 merging into the shank section 50.

The scope of the described invention is intended to include all embodiments coming within the meaning of the following claims. The foregoing examples illustrate useful forms of the invention, but are not to be considered as limiting its scope, as those skilled in the art will be aware that additional variants and modifications of the invention can readily be formulated without departing from the meaning of the following claims.

The invention claimed is:

1. A rotary cutting tool comprising:
   a shank defined around a tool axis; and
   a cutting section comprising a plurality of teeth;
   said cutting section being divided into a plurality of different consecutive cutting zones defined along said tool axis of said shank and having predetermined axial extents; and
   wherein a first one of said plurality of different cutting zones comprises a first predetermined core form, a first predetermined zone cutting length, first predetermined cutting edges, and a first predetermined tooth land form such that said first one of said plurality of different cutting zones can perform a slotting operation; a second one of said plurality of different cutting zones comprises a second predetermined core form, a second predetermined zone cutting length, second predetermined cutting edges, and a second predetermined tooth land form such that said second one of said plurality of different cutting zones can perform a side milling roughing operation; a third one of said plurality of different cutting zones comprises a third predetermined core form, a third predetermined zone cutting length, third predetermined cutting edges, and a third pre-determined tooth land form such that said third one of said plurality of different cutting zones can perform a side milling finishing operation; a fourth one of said plurality of different cutting zones comprises grooves, forming said cutting teeth, blending into said shank, and wherein further at least one of said plurality of different consecutive cutting zones has a core section which has a diametrical extent that is constant throughout said axial extent of said at least one of said plurality of different consecutive cutting zones.

2. The rotary cutting tool as claimed in claim 1, having a constant outer diameter along the length of the cutting section.

3. The rotary cutting tool as claimed in claim 1, wherein said cutting teeth are straight parallel to the tool axis.

4. The rotary cutting tool as claimed in claim 1, wherein said cutting teeth are of spiral form.

5. The rotary cutting tool as claimed in claim 1, wherein said cutting tool is an end mill.

6. The rotary cutting tool as claimed in claim 1, wherein:
   the length of said first cutting zone, constructed for slotting, is in the range of 0.3 D to 2.0 D, D being the outer diameter of said cutting section, said length being at a maximum for stub end mills and being at a minimum for extra long end mills;
   said second cutting zone constructed for side milling roughing, combined with said first cutting zone, has a length of 0.0 D to 2.0 D, said length being at a minimum for stub end mills and at a maximum for regular length end mills;
   the length of said third zone constructed for finish side milling, combined with said first zone or with said second zone, is in the range of at least 0.0 D to 8.0 D, said length being at a minimum for stub end mills and being at a maximum for extra long end mills; and
   said fourth cutting zone being a transfer zone from said first, second, and third cutting zones to said shank and has a length in the range 0.3 D to 1.5 D, said length being set according to the length of the cutting section and the number of teeth.

7. The rotary cutting tool as claimed in claim 1, wherein at least one zone includes at least two sub-zones wherein each sub-zone comprises a predetermined geometrical elementary core form.

8. The rotary cutting tool as claimed in claim 1, wherein at least one zone includes at least two sub-zones wherein each sub-zone comprises teeth land width forms having predetermined teeth land width dimensions.

9. The rotary cutting tool as claimed in claim 1, wherein:
   in said first zone, the core diameter and the width of the tooth land form both increase;
   in said second zone, the core diameter and the width of the tooth land form both remain constant;

in said third zone, the core diameter and the width of the tool land form both increase further; and in said fourth zone, the core diameter increases in concave form towards said shank.

10. The rotary cutting tool as claimed in claim 1, wherein:

in said first zone, the core diameter and the width of the tooth land form both remain constant;

in said second zone, the core diameter increases and the width of the tooth land form remains constant or increases;

in said third zone, the core diameter again increases and the width of the tooth land form increases or remains constant; and in said fourth zone, the core diameter increases in concave form towards said shank.

11. The rotary cutting tool as claimed in claim 1, wherein said rotary cutting tool is a ball nosed cutter wherein in said first zone, the core diameter has a convex taper form, and the width of the tooth land form increases or remains constant.

12. A rotary cutting tool comprising:

a shank defined around a tool axis; and a cutting section comprising a plurality of teeth, said cutting section being divided into a plurality of different cutting zones extending consecutively along said tool axis and having predetermined axial extents, wherein each one of said different cutting zones has its own core form and its own cutting edges, its own teeth land form, and its own zone cutting length, said core form, said cutting edges, said teeth land forms, and said cutting lengths being selected according to a predetermined task for which each one of said different cutting zones of said rotary cutting tool is to perform a different predetermined operation;

wherein in a first one of said plurality of cutting zones starting from an end face of said cutting tool, said cutting tool comprises structure for performing a slotting operation; in a second one of said plurality of cutting zones, said cutting tool comprises structure for performing a side milling roughing operation; in a third one of said plurality of cutting zones, said cutting tool comprises structure for performing a side milling finishing operation; and in a fourth one of said plurality of culling zones, said grooves forming said cutting teeth blend into said shank, and wherein further, at least one of said plurality of different consecutive cutting zones has a core section which has a diametrical extent that is constant throughout said axial extent of said at least one of said plurality of different consecutive cutting zones.

* * * * *